US011633852B2

(12) United States Patent
Takahashi

(10) Patent No.: US 11,633,852 B2
(45) Date of Patent: Apr. 25, 2023

(54) COMPUTING DEVICE, MACHINE LEARNING METHOD, AND STORAGE MEDIUM

(71) Applicant: Toyota Jidosha Kabushiki Kaisha, Toyota (JP)

(72) Inventor: Taro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 16/897,567

(22) Filed: Jun. 10, 2020

(65) Prior Publication Data
US 2021/0008717 A1 Jan. 14, 2021

(30) Foreign Application Priority Data
Jul. 9, 2019 (JP) .............................. JP2019-127781

(51) Int. Cl.
*B25J 9/16* (2006.01)
*G06N 20/00* (2019.01)
*G06N 7/00* (2023.01)
*G05B 13/02* (2006.01)

(52) U.S. Cl.
CPC .............. *B25J 9/163* (2013.01); *B25J 9/1664* (2013.01); *G05B 13/0265* (2013.01); *G06N 7/00* (2013.01); *G06N 20/00* (2019.01)

(58) Field of Classification Search
CPC ......... B25J 9/163; B25J 9/1664; G06N 20/00; G06N 7/00; G05B 13/0265
See application file for complete search history.

(56) References Cited

U.S. PATENT DOCUMENTS

| 9,014,852 B2 * | 4/2015 | Iba .......................... B25J 9/161 |
| | | 700/250 |
| 9,579,789 B2 * | 2/2017 | Passot .................... G06N 3/008 |
| 9,630,317 B2 * | 4/2017 | Izhikevich ........... G05D 1/0022 |
| 2010/0094786 A1 | 4/2010 | Gupta et al. |

(Continued)

FOREIGN PATENT DOCUMENTS

| DE | 102016009113 A1 | 2/2017 |
| DE | 102018002423 A1 | 10/2018 |
| JP | 2018-051664 A | 4/2018 |

*Primary Examiner* — Jaime Figueroa
*Assistant Examiner* — Joshua Alexander Garza
(74) *Attorney, Agent, or Firm* — Dinsmore & Shohl LLP

(57) ABSTRACT

A computing device performs computation for controlling operations of a mobile manipulator configured to hold a plurality of target objects with a manipulator and move the target objects to predetermined positions. The computing device includes a storage and a calculator. The storage stores a trained machine learning model trained by inputting a plurality of training data sets, which are combinations of state variables and pieces of determination data associated with the state variables. The training data sets are acquired in advance. The calculator outputs a movement-target object to be moved to a predetermined position at current time by inputting the state variable to the trained machine learning model read from the storage. The state variable contains relative positions of the target objects to a specific portion of the mobile manipulator. The determination data associated with the state variable represents the movement-target object.

7 Claims, 10 Drawing Sheets

(56) References Cited

U.S. PATENT DOCUMENTS

| | | | |
|---|---|---|---|
| 2010/0249999 A1* | 9/2010 | Glaser | B25J 9/161 |
| | | | 700/258 |
| 2014/0074291 A1* | 3/2014 | Emoto | B25J 13/08 |
| | | | 700/258 |
| 2014/0371907 A1 | 12/2014 | Passot et al. | |
| 2016/0016311 A1 | 1/2016 | Konolige et al. | |
| 2016/0176043 A1 | 6/2016 | Mishra et al. | |
| 2017/0028553 A1 | 2/2017 | Tsuda et al. | |
| 2018/0079076 A1* | 3/2018 | Toda | G06N 5/022 |
| 2018/0089589 A1 | 3/2018 | Ooba | |
| 2018/0281181 A1* | 10/2018 | Ooba | B25J 9/1669 |
| 2018/0284760 A1 | 10/2018 | Gupta et al. | |
| 2018/0330200 A1* | 11/2018 | Shibata | G06N 3/04 |
| 2019/0047143 A1* | 2/2019 | Matsudaira | B25J 13/085 |
| 2020/0171653 A1* | 6/2020 | Holson | G05D 1/0088 |

\* cited by examiner

○ TARGET OBJECT

▨ OBSTACLE

○ TARGET OBJECT

● SUITABLE MOVEMENT-TARGET OBJECT TO BE MOVED TO PREDETERMINED POSITION AT CURRENT TIME

◎ TARGET OBJECT THAT MAY BE MOVED TO PREDETERMINED POSITION AT CURRENT TIME

× TARGET OBJECT THAT SHOULD NOT BE MOVED TO PREDETERMINED POSITION AT CURRENT TIME

COMPUTING DEVICE, MACHINE LEARNING METHOD, AND STORAGE MEDIUM

CROSS-REFERENCE TO RELATED APPLICATIONS

This application claims priority to Japanese Patent Application No. 2019-127781 filed on Jul. 9, 2019, which is incorporated herein by reference in its entirety including the specification, drawings and abstract.

BACKGROUND

1. Technical Field

The present disclosure relates to a computing device configured to perform computation for controlling operations of a mobile manipulator that holds a plurality of movement-target objects with a manipulator and moves the movement-target objects to predetermined positions. The present disclosure also relates to a machine learning method and a storage medium.

2. Description of Related Art

There is known a robot configured to hold a target object with a manipulator. For example, Japanese Unexamined Patent Application Publication No. 2018-051664 (JP 2018-051664 A) discloses a technique in which the robot is fixed to a predetermined position and a machine learning model learns the sequence in which the manipulator holds a plurality of objects placed in a predetermined area on a conveyor.

SUMMARY

The technique disclosed in JP 2018-051664 A is provided on the premise that the robot is fixed to the predetermined position. Therefore, this technique cannot be applied to a mobile manipulator in which a robot provided with a manipulator is movable.

The present disclosure provides a computing device capable of appropriately determining, among target objects, an optimum movement-target object to be moved to a predetermined position at current time by a mobile manipulator.

A computing device according to a first aspect of the present disclosure is configured to perform computation for controlling operations of a mobile manipulator configured to hold a plurality of target objects with a manipulator and move the target objects to predetermined positions. The computing device includes a storage and a calculator. The storage is configured to store a trained machine learning model trained by inputting a plurality of training data sets, which are combinations of state variables and pieces of determination data associated with the state variables. The training data sets are acquired in advance. The calculator is configured to output a movement-target object to be moved to a predetermined position at current time by inputting the state variable to the trained machine learning model read from the storage. The state variable contains relative positions of the target objects to a specific portion of the mobile manipulator. The determination data associated with the state variable represents the movement-target object.

The state variable of the machine learning model that contains the relative positions of the target objects to the specific portion of the mobile manipulator shows positional relationships of the target objects relative to the specific portion of the mobile manipulator. Thus, it is possible to appropriately determine, among the target objects, an optimum movement-target object to be moved to a predetermined position at current time by the mobile manipulator whose absolute position is changed.

In the aspect described above, the state variable may contain a relative position of an obstacle to the specific portion of the mobile manipulator. Even if the relative positions of the target objects to the specific portion of the mobile manipulator are the same, the ease of the movement to a predetermined position varies depending on whether an obstacle is present between the mobile manipulator and each target object. With the state variable containing the relative position of the obstacle to the specific portion of the mobile manipulator, an optimum movement-target object to be moved to a predetermined position at current time can be determined more appropriately.

In the aspect described above, the relative positions of the target objects to the specific portion of the mobile manipulator and the relative position of the obstacle to the specific portion of the mobile manipulator may be represented by data on a map or on a bitmap image. Thus, adjacent obstacles can collectively be handled as a unit in the process of training the machine learning model.

In the aspect described above, an output of the movement-target object may be data representing a relative position of the movement-target object to the specific portion of the mobile manipulator on the map or on the bitmap image. Therefore, the output can be represented in a standardized manner. Thus, it is expected that the learning performance of the machine learning model is further improved. When the data representing the relative position of the movement-target object to the specific portion of the mobile manipulator is output on the map or on the bitmap image, there is no need to identify the movement-target object again. Thus, it is expected that the computation amount is reduced.

In the aspect described above, the state variable may contain route lengths of routes from the mobile manipulator to the target objects. The route lengths are obtained based on a route plan. Even if the relative positions of the target objects to the specific portion of the mobile manipulator are the same, the ease of the movement to a predetermined position varies depending on the route lengths of the routes from the mobile manipulator to the target objects. Thus, an optimum movement-target object to be moved to a predetermined position at current time can be determined more appropriately.

In the aspect described above, the state variable may contain route lengths of routes from the target objects to predetermined positions associated with the target objects. Even if the relative positions of the target objects to the specific portion of the mobile manipulator are the same, the ease of the movement to a predetermined position varies depending on the route lengths of the routes from the target objects to the predetermined positions associated with the target objects. Thus, an optimum movement-target object to be moved to a predetermined position at current time can be determined more appropriately.

In the aspect described above, relative positions of the target objects and the obstacle to the specific portion of the mobile manipulator may contain information on a gravity direction. If an obstacle in front of a target object for the mobile manipulator is longer than the target object in the gravity direction, the mobile manipulator cannot hold the target object unless the mobile manipulator moves to a position where the target object is in front of the obstacle for the mobile manipulator. If an obstacle in front of a target object for the mobile manipulator is shorter than the target object in the gravity direction, the mobile manipulator can hold the target object by gripping an upper part of the target object in the gravity direction even though the obstacle is in front of the target object. When the relative positions of the target objects and the obstacle to the specific portion of the mobile manipulator contain the information on the gravity direction, an optimum movement-target object to be moved to a predetermined position at current time can be determined more appropriately.

In the aspect described above, the relative positions of the target objects to the specific portion of the mobile manipulator may contain information on holdable areas for the target objects. Even if the relative positions of the target objects to the specific portion of the mobile manipulator are the same, the ease of the movement to a predetermined position varies depending on whether the holdable area for each target object is located in front of or behind the mobile manipulator. When the relative positions of the target objects to the specific portion of the mobile manipulator contain the information on the holdable areas for the target objects, an optimum movement-target object to be moved to a predetermined position at current time can be determined more appropriately.

A machine learning method according to a second aspect of the present disclosure is a machine learning method for a machine learning model configured such that a computer performs a function of outputting a movement-target object to be moved to a predetermined position at current time in an operation of holding a plurality of target objects with a manipulator of a mobile manipulator and moving the target objects to predetermined positions. The machine learning method includes training the machine learning model by inputting a plurality of training data sets, which are combinations of state variables and movement-target objects to be moved to predetermined positions at current time. The state variables each contain relative positions of the target objects to a specific portion of the mobile manipulator. The movement-target objects are represented by pieces of determination data and associated with the state variables. Thus, the machine learning model can be trained so that an optimum movement-target object to be moved to a predetermined position at current time is determined more appropriately among the plurality of target objects in the operation of holding the target objects with the manipulator of the mobile manipulator and moving the target objects to the predetermined positions.

A non-transitory storage medium according to a third aspect of the present disclosure stores instructions that are executable by one or more processors and that cause the one or more processors to perform the following functions. The functions include training a machine learning model by inputting a plurality of training data sets acquired in advance. The training data sets are combinations of state variables and movement-target objects to be moved to predetermined positions at current time. The state variables each contain relative positions of a plurality of target objects to a specific portion of a mobile manipulator configured to hold the target objects with a manipulator and move the target objects to predetermined positions. The movement-target objects are represented by pieces of determination data and associated with the state variables. The functions further include outputting the movement-target object by inputting the state variable to the trained machine learning model. Thus, an optimum movement-target object to be moved to a predetermined position at current time can be determined more appropriately in the operation of holding the plurality of target objects with the manipulator of the mobile manipulator and moving the target objects to the predetermined positions.

According to the present disclosure, it is possible to appropriately determine an optimum movement-target object to be moved to a predetermined position at current time by the mobile manipulator.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
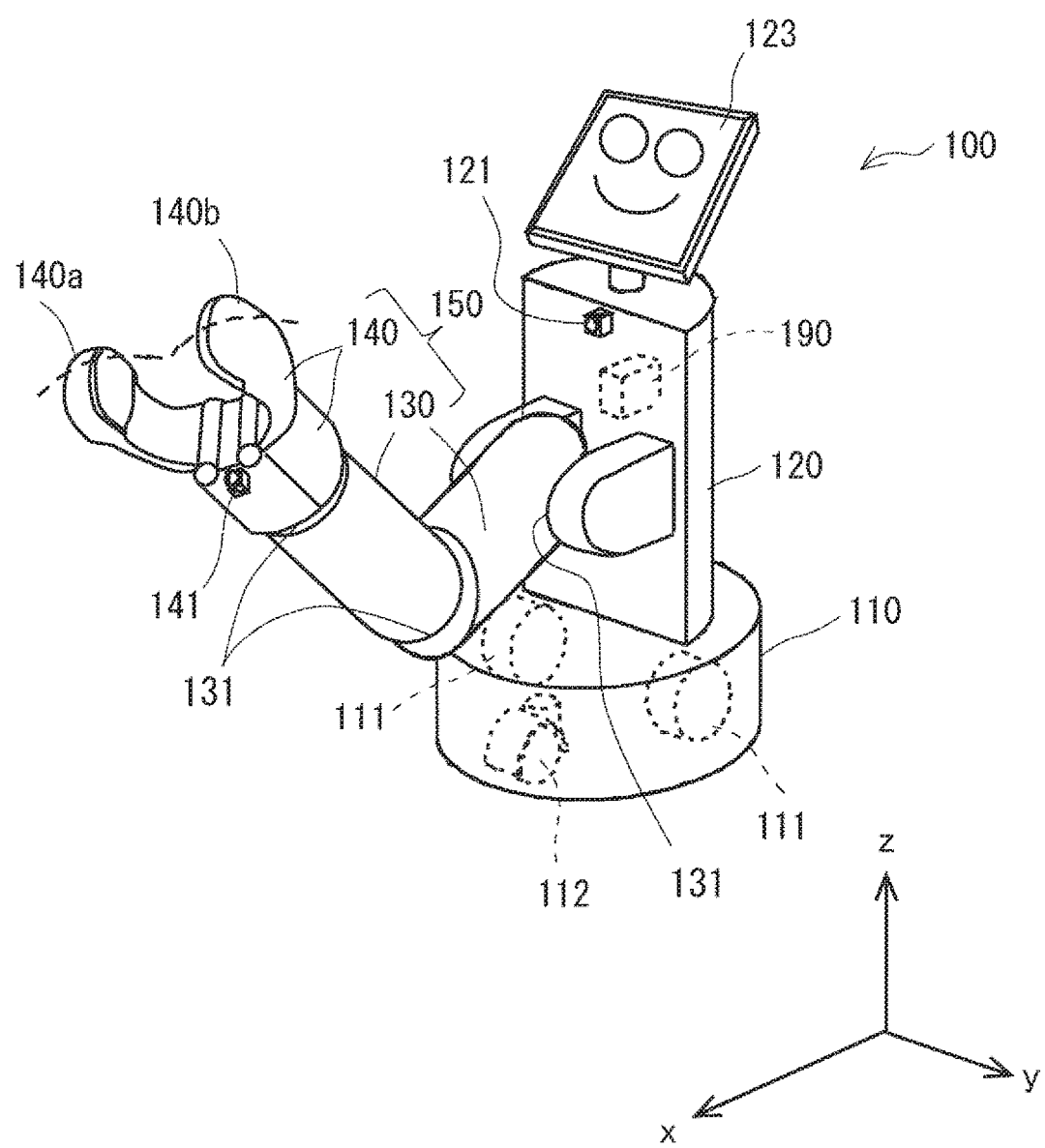
FIG. 1 is an external perspective view of a mobile manipulator to which a computing device according to an embodiment is applied.

An embodiment of the present disclosure is described below. The disclosure according to the claims is not limited to the embodiment described below. All constituent elements described in the embodiment are not essential to solve the problem. For clarity, some parts of the following description and the drawings are omitted or simplified as appropriate. In the drawings, the same elements are represented by the same reference symbols and redundant description is omitted as necessary.

A computing device according to this embodiment performs computation for controlling operations of a mobile manipulator that moves a plurality of target objects to predetermined positions with a manipulator in, for example, a house or factory. The mobile manipulator is movable with a carriage or the like. Examples of the operation of moving a plurality of target objects to predetermined positions with the manipulator include a cleanup operation.

First, description is given of the structure of the mobile manipulator to which the computing device according to this embodiment is applied. FIG. 1 is an external perspective view of a mobile manipulator 100 to which the computing device according to this embodiment is applied. In FIG. 1, an xy plane represents a traveling field of the mobile manipulator 100, and a positive z-axis direction represents an upward direction. As illustrated in FIG. 1, the mobile manipulator 100 roughly includes a carriage 110, a body 120, a robotic arm 130, and a robotic hand 140. The carriage 110 serves as a movement mechanism configured to move the mobile manipulator 100 on the traveling field. The robotic arm 130 and the robotic hand 140 constitute a manipulator 150.

The carriage 110 supports, in a cylindrical housing, two driving wheels 111 and one caster 112 to be in contact with the traveling field. The two driving wheels 111 are arranged such that their rotational axes coincide with each other. The driving wheels 111 are independently driven to rotate by motors (not illustrated). The caster 112 is a driven wheel supported such that a turning axis extending in a vertical direction from the carriage 110 is located away from a rotational axis of the wheel. The caster 112 moves in conjunction with a moving direction of the carriage 110. For example, the mobile manipulator 100 moves straightforward when the two driving wheels 111 rotate at the same rotation speed in the same direction, and turns about a vertical axis passing through the carriage 110 at the center between the two driving wheels 111 when the two driving wheels 111 rotate at the same rotation speed in opposite directions.

The body 120 supports the robotic arm 130, and has a display panel 123 that constitutes a user interface. For example, the display panel 123 is a liquid crystal display panel configured to display a character's face or information related to the mobile manipulator 100. The display panel 123 has a touch panel on its display surface to receive instructions input by a user.

The body 120 has an environment camera 121 at a position where the environment camera 121 can provide a broad view of a forward environmental space including an operation range of the manipulator 150. The environment camera 121 includes an imaging element such as a complementary metal oxide semiconductor (CMOS) image sensor, and an image data generator. The environment camera 121 outputs image data generated by capturing an image of the forward environmental space. The body 120 includes a control unit 190. The control unit 190 includes a controller and a memory described later.

The robotic arm 130 supported on the body 120 has a plurality of links, for example, two links as illustrated in FIG. 1. The robotic arm 130 can take various postures by driving actuators provided at joints 131 (such as a wrist joint, an elbow joint, and a shoulder joint) that couple the links together such that the links are pivotable. Each joint 131 is provided with a speed reducing mechanism. The robotic hand 140 is connected to the distal end of the robotic arm 130. The entire robotic hand 140 is driven by an actuator to turn about a turning axis parallel to an extending direction of the link at the distal end of the robotic arm 130. The robotic hand 140 has a first finger 140a and a second finger 140b to be driven by an actuator provided at the distal end of the robotic hand 140. The first finger 140a and the second finger 140b hold an object by pinching the object through an operation in which the first finger 140a and the second finger 140b move closer to each other as indicated by dashed lines.

The operation of holding the target object with the robotic hand 140 is not limited to the operation of gripping the target object with the first finger 140a and the second finger 140b of the robotic hand 140, but may include an operation of chucking the target object with a chucking mechanism to be provided at the distal end of the robotic hand 140. The operation of holding the target object with the robotic hand 140 may also include an operation of holding the target object in cooperation between gripping and chucking by the robotic hand 140. The robotic hand 140 has a hand camera 141. The hand camera 141 includes an imaging element such as a CMOS image sensor, and an image data generator. The hand camera 141 outputs image data generated by capturing an image of a space in front of the robotic hand 140.

Figure 2:
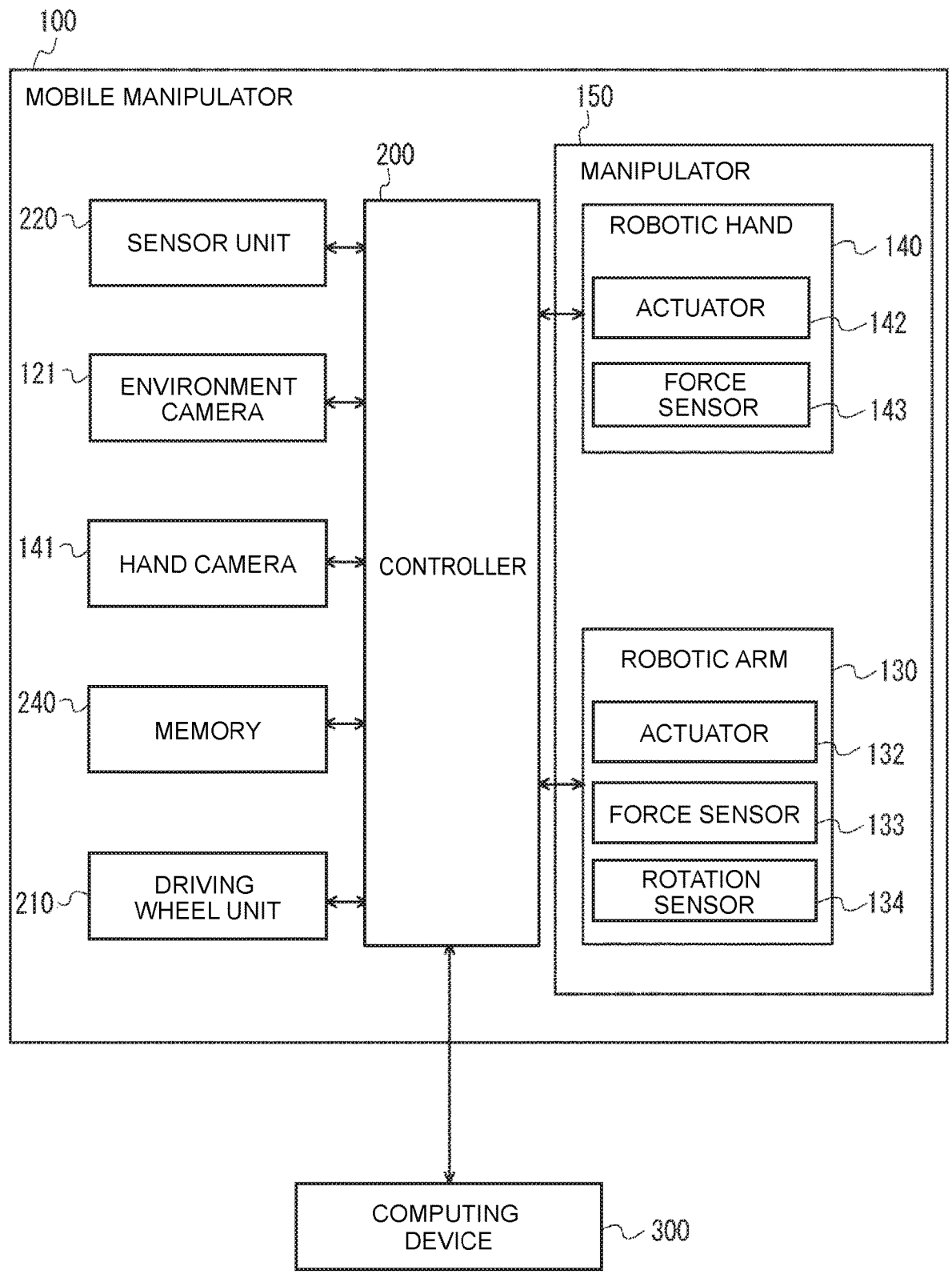
FIG. 2 is a block diagram illustrating the control configuration of the mobile manipulator.

FIG. 2 is a block diagram illustrating the control configuration of the mobile manipulator 100. For example, a controller 200 is a central processing unit (CPU), and is housed in the control unit 190 of the body 120 (see FIG. 1). A driving wheel unit 210 is provided on the carriage 110 (see FIG. 1), and includes drive circuits and motors for driving the driving wheels 111 (see FIG. 1).

A sensor unit 220 includes various sensors configured to detect an obstacle during movement or to detect external contact. The sensors are distributed in the carriage 110 and the body 120 (see FIG. 1). The controller 200 transmits control signals to the sensor unit 220 to drive various sensors and acquire their outputs.

As described above, the environment camera 121 is used for observing a forward environmental space including the operation ranges of the robotic arm 130 and the robotic hand 140. The environment camera 121 captures an image in response to an image capturing instruction from the controller 200. The environment camera 121 transfers generated image data to the controller 200. As described above, the hand camera 141 is used for observing a space in front of the robotic hand 140. The hand camera 141 captures an image in response to an image capturing instruction from the controller 200. The hand camera 141 transfers generated image data to the controller 200.

A memory 240 is a non-volatile storage medium such as a solid-state drive. The memory 240 stores a control program for controlling the mobile manipulator 100, and various parameters, functions, and lookup tables for use in the control.

In addition to the structural parts described with reference to FIG. 1, the robotic arm 130 includes an actuator 132, a rotation sensor 134, and a force sensor 133. The actuator 132 drives each joint 131. The rotation sensor 134 detects information on rotation of each joint 131. The force sensor 133 detects an operation force (torque) of each joint 131. Examples of the actuator 132 include a servomotor. Examples of the rotation sensor 134 include an encoder. Examples of the force sensor 133 include a torque sensor configured to detect the torque of each joint 131. The robotic hand 140 includes an actuator 142 and a force sensor 143. The actuator 142 drives the first finger 140a and the second finger 140b (see FIG. 1). The force sensor 143 detects an operation force of the robotic hand 140.

The controller 200 controls rotation of the driving wheels 111 by transmitting a drive signal to the driving wheel unit 210. The controller 200 controls operations of the robotic arm 130 and the robotic hand 140 based on a computation result from a computing device 300 according to this embodiment. That is, the controller 200 transmits drive signals to the actuator 132 of the robotic arm 130 and the actuator 142 of the robotic hand 140 based on the computation result from the computing device 300 according to this embodiment.

Figure 3:
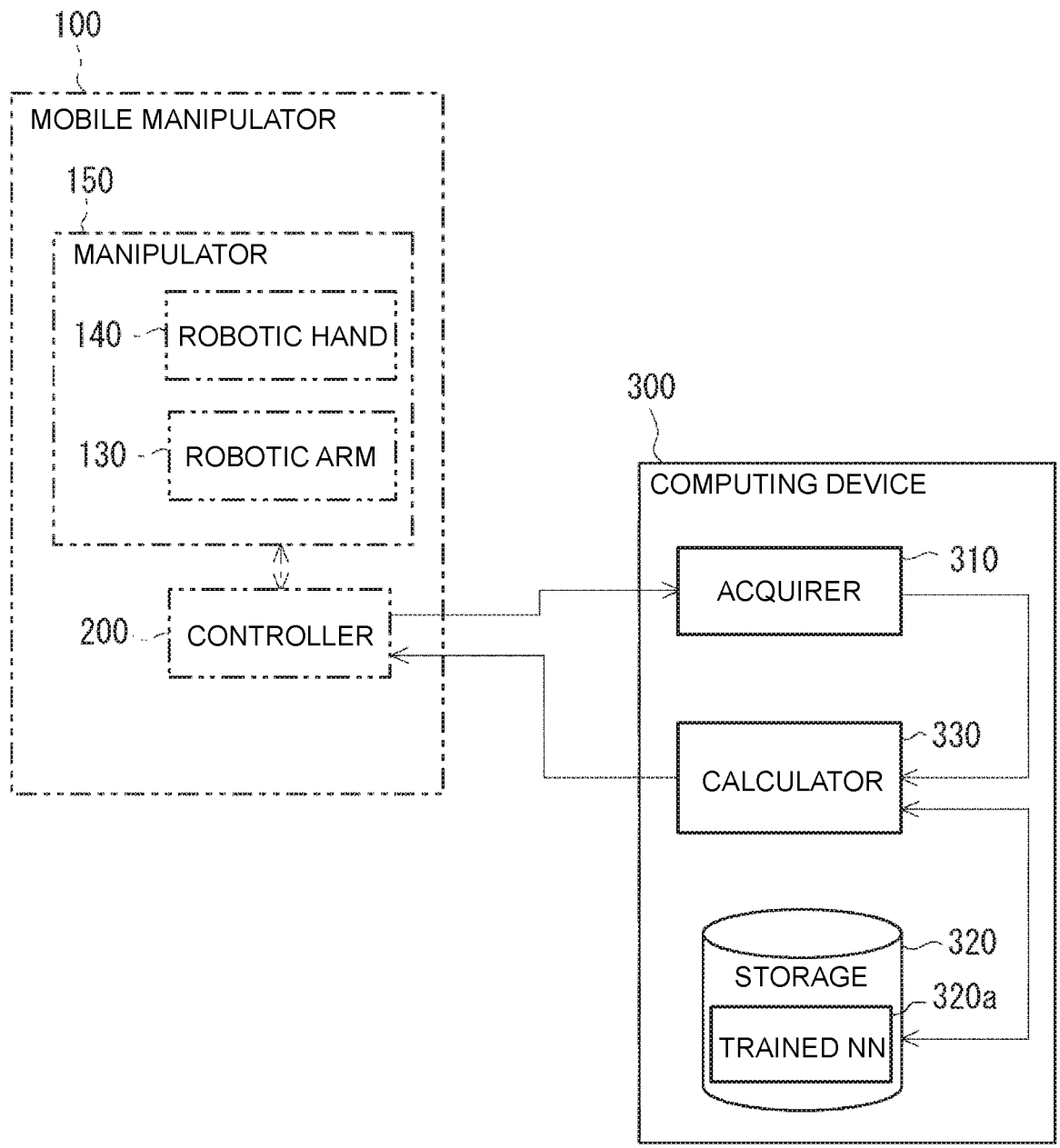
FIG. 3 is a block diagram illustrating the configuration of the computing device.

Next, the configuration of the computing device 300 according to this embodiment is described. FIG. 3 is a block diagram illustrating the configuration of the computing device 300. As illustrated in FIG. 3, the computing device 300 mainly includes an acquirer 310, a storage 320, and a calculator 330.

The acquirer 310 acquires a state variable, and transfers the state variable to the calculator 330. The acquirer 310 acquires relative positions of target objects to a specific portion of the mobile manipulator 100 by analyzing image data showing an operation environment photographed by the environment camera 121 or the hand camera 141 (see FIG. 2). The specific portion of the mobile manipulator 100 may be a position calculated by computation, such as a position of the center of gravity or a position of the robotic hand 140 projected onto a floor. The acquirer 310 includes a communication interface for connection to the Internet. Examples of the communication interface include a wireless local area network (LAN) unit.

For example, the storage 320 is a hard disk drive, and stores a trained machine learning model. Examples of the machine learning model include a neural network. The trained machine learning model (hereinafter referred to as, for example, "trained NN 320a") is trained by inputting a plurality of training data sets, which are combinations of state variables acquired in advance and pieces of determination data associated with the state variables. Description is given later about a specific method for training the machine learning model to obtain the trained NN 320a. In addition to the trained NN 320a, the storage 320 stores various software programs to be executed by the calculator 330.

For example, the calculator 330 is a CPU, and outputs a movement-target object to be cleared away at current time by inputting the state variable received from the acquirer 310 to the trained NN 320a read from the storage 320.

Figure 4:
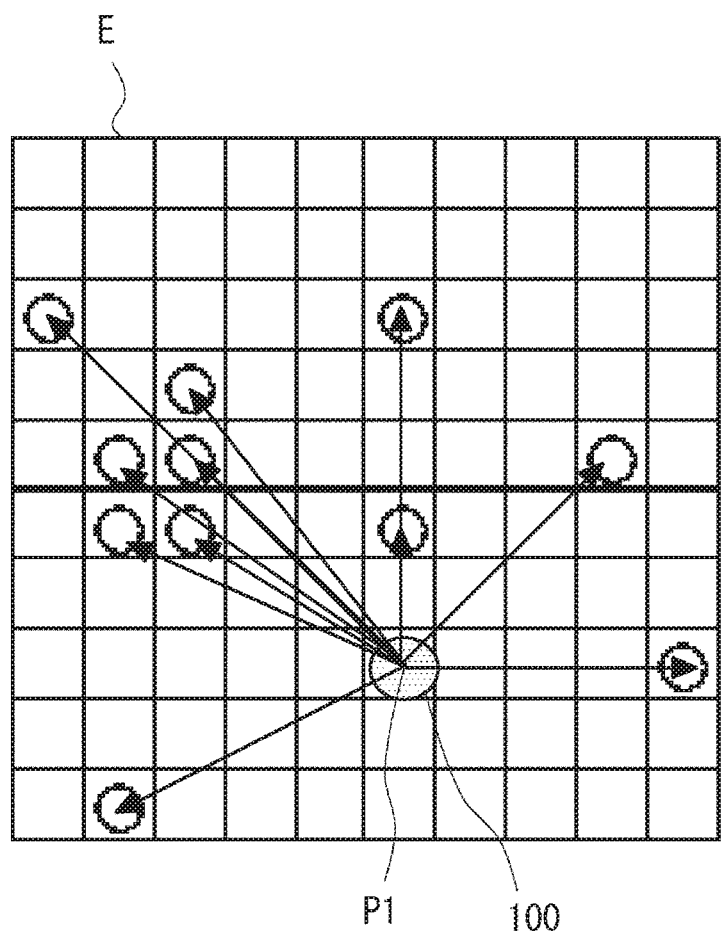
FIG. 4 is a schematic diagram for describing a state variable of a machine learning model.

Next, the state variable of the machine learning model is described. The following description is given with reference to FIG. 3 as appropriate. FIG. 4 is a schematic diagram for describing the state variable of the machine learning model. In an operation environment map E, target objects are represented by circles. As indicated by arrows in FIG. 4, the state variable of the machine learning model contains relative positions of the target objects to the specific portion of the mobile manipulator 100 (represented by circles in FIG. 4). That is, a relative position of a target object to a specific portion P1 of the mobile manipulator 100 is represented by a vector from the specific portion P1 of the mobile manipulator 100 to the target object. The state variable containing the relative positions of the target objects to the specific portion P1 of the mobile manipulator 100 shows positional relationships of the target objects relative to the specific portion P1 of the mobile manipulator 100. Thus, an optimum movement-target object to be moved to a predetermined position at current time can be determined appropriately even in the case of the mobile manipulator 100 according to this embodiment, which moves to change its absolute position.

The relative positions of the target objects to the specific portion of the mobile manipulator 100 may contain information on holdable areas for the target objects. The information on the holdable areas for the target objects is acquired by recognizing the target objects from image data showing the operation environment photographed by the environment camera 121 or the hand camera 141. Even if the relative positions of the target objects to the specific portion of the mobile manipulator 100 are the same, the ease of the cleanup operation varies depending on whether the holdable area for each target object is located in front of or behind the mobile manipulator 100. When the relative positions of the target objects to the specific portion P1 of the mobile manipulator 100 contain the information on the holdable areas for the target objects, an optimum movement-target object to be moved to a predetermined position at current time can be determined more appropriately.

Figure 5:
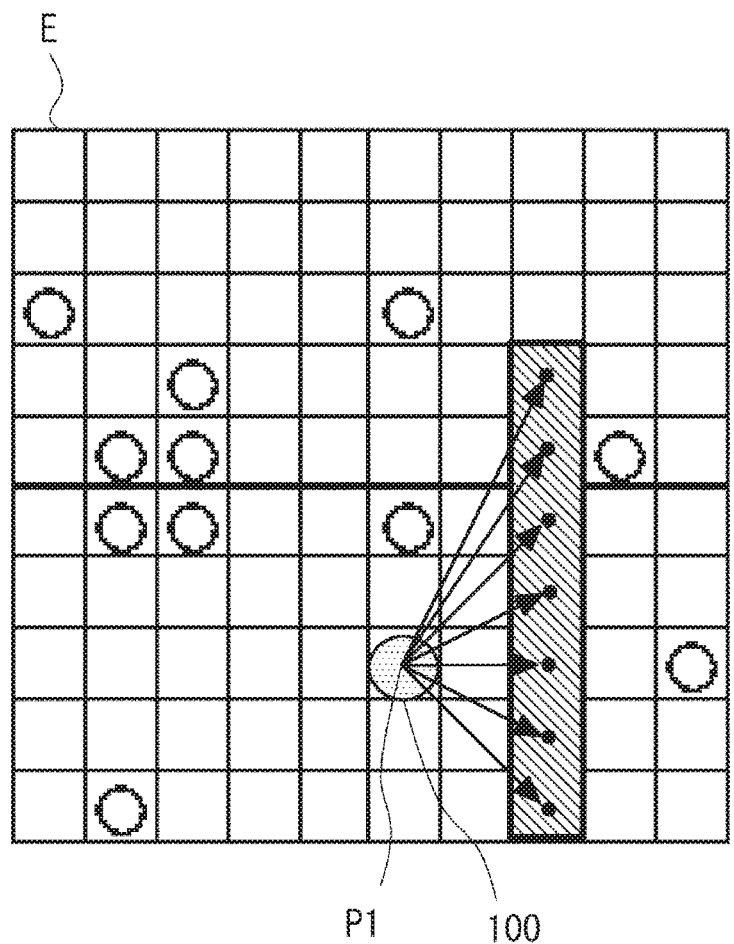
FIG. 5 is a schematic diagram illustrating a variate that may be contained in the state variable of the machine learning model together with relative positions of target objects to a specific portion of the mobile manipulator.

FIG. 5 is a schematic diagram illustrating a variate that may be contained in the state variable of the machine learning model together with the relative positions of the target objects to the specific portion of the mobile manipulator 100. In the operation environment map E, the target objects are represented by circles, and obstacles are represented by a hatched area. The obstacles may be represented by point group information included in the hatched area. As indicated by arrows in FIG. 5, in some examples, the state variable of the machine learning model contains relative positions of the obstacles to the specific portion P1 of the mobile manipulator 100. The relative position of each obstacle to the specific portion P1 of the mobile manipulator 100 is represented by a vector from the specific portion P1 of the mobile manipulator 100 to a point group of the obstacle. Even if the relative positions of the target objects to the specific portion P1 of the mobile manipulator 100 are the same, the ease of the cleanup operation varies depending on whether an obstacle is present between the mobile manipulator 100 and each target object. Thus, an optimum movement-target object to be moved to a predetermined position at current time can be determined more appropriately.

The relative positions of the target objects and the obstacles to the specific portion of the mobile manipulator 100 may contain information on a gravity direction. That is, the relative positions of each target object and each obstacle to the specific portion of the mobile manipulator 100 are represented by three-dimensional vectors. If an obstacle in front of a target object for the mobile manipulator 100 is longer than the target object in the gravity direction, the mobile manipulator 100 cannot hold the target object unless the mobile manipulator 100 moves to a position where the target object is in front of the obstacle for the mobile manipulator 100. If an obstacle in front of a target object for the mobile manipulator 100 is shorter than the target object in the gravity direction, the mobile manipulator 100 can hold the target object by gripping an upper part of the target object in the gravity direction even though the obstacle is in front of the target object. Thus, an optimum movement-target object to be moved to a predetermined position at current time can be determined more appropriately.

In some examples, the relative positions of the target objects to the specific portion of the mobile manipulator 100 and the relative positions of the obstacles to the specific portion of the mobile manipulator 100 are represented by data on a map or on a bitmap image. The data represents, in a standardized manner, a state in which any objects or obstacles are present in a surrounding space or a state in which no object is present. Therefore, learning can proceed while taking the positional relationships into consideration in a standardized manner. Thus, the learning precision can be increased.

Figure 6:
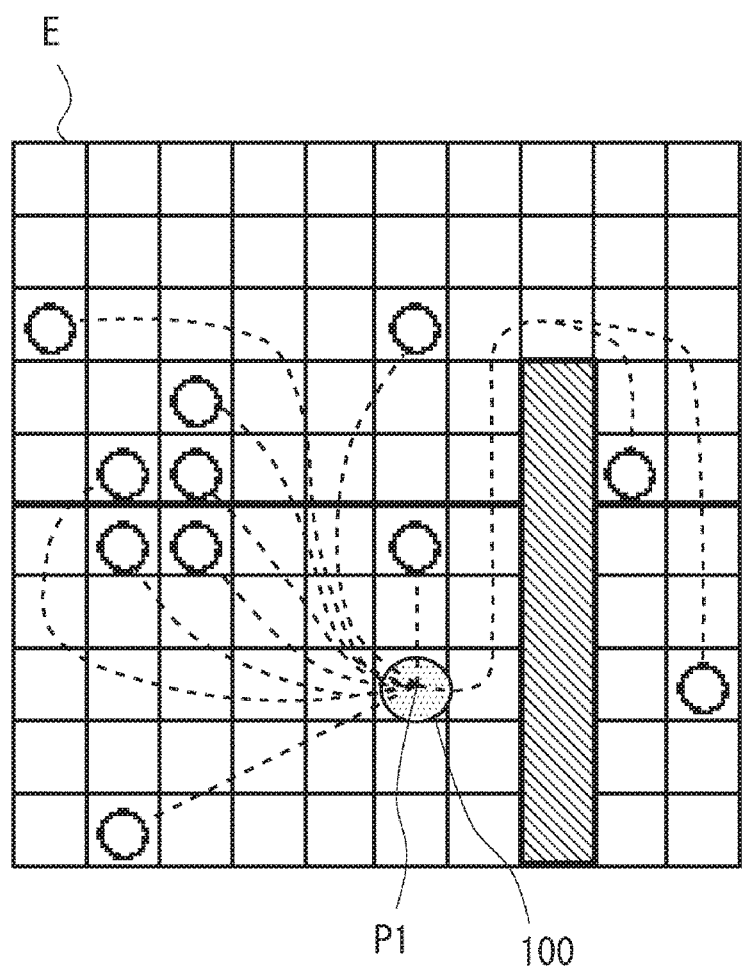
FIG. 6 is a schematic diagram illustrating a variate that may be contained in the state variable of the machine learning model together with the relative positions of the target objects to the specific portion of the mobile manipulator.

FIG. 6 is a schematic diagram illustrating a variate that may be contained in the state variable of the machine learning model together with the relative positions of the target objects to the specific portion of the mobile manipulator 100. In the operation environment map E, the target objects are represented by circles, and the obstacles are represented by a hatched area. As indicated by dashed lines in FIG. 6, in some examples, the state variable of the machine learning model contains route lengths of routes from the mobile manipulator 100 to the target objects. The route lengths of the routes from the mobile manipulator 100 to the target objects are obtained based on a route plan. The route plan may be created by using a known method such as a rapidly-exploring random tree (RRT). Even if the relative positions of the target objects to the specific portion P1 of the mobile manipulator 100 are the same, the ease of the cleanup operation varies depending on the route lengths of the routes from the mobile manipulator 100 to the target objects. Thus, an optimum movement-target object to be moved to a predetermined position at current time can be determined more appropriately.

Figure 7:
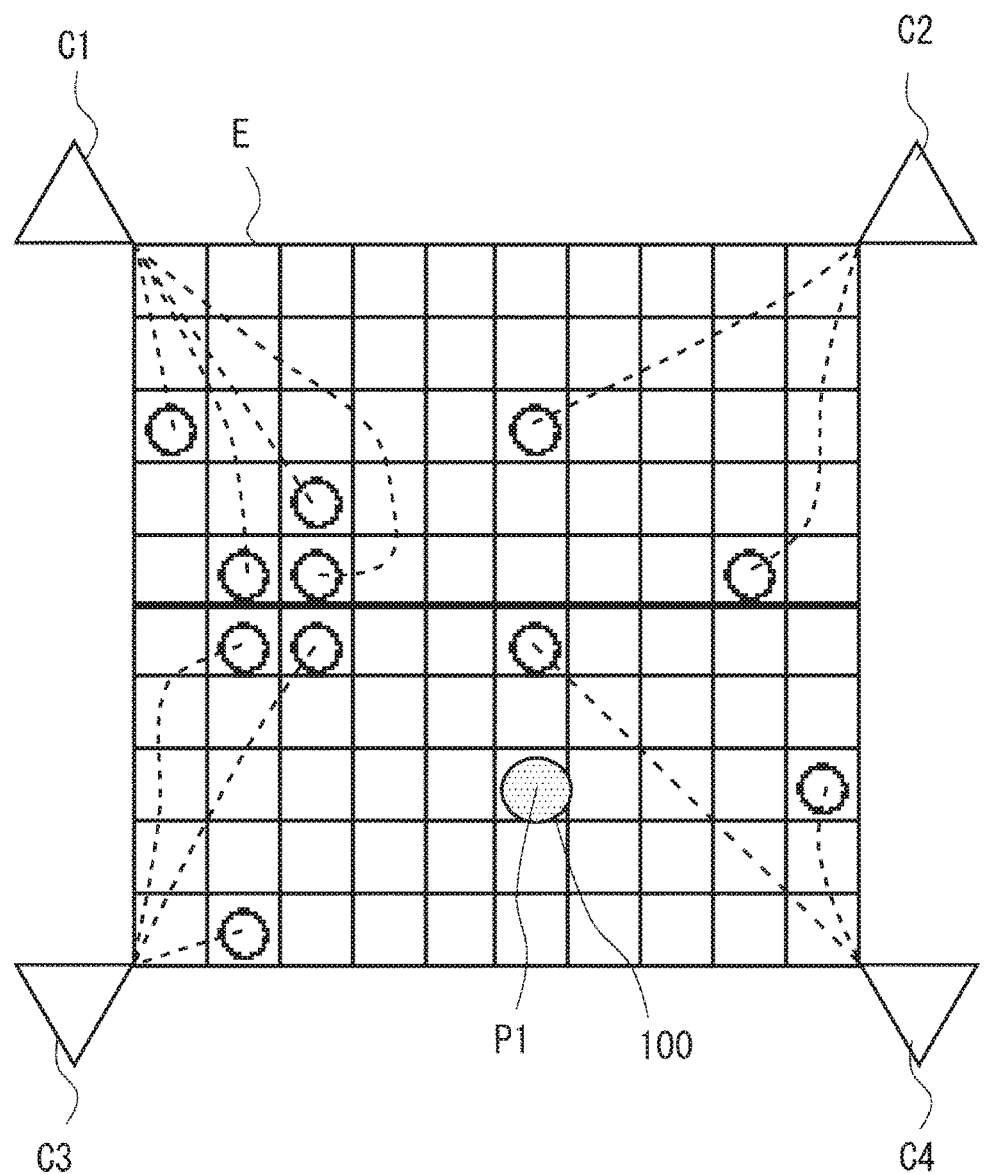
FIG. 7 is a schematic diagram illustrating a variate that may be contained in the state variable of the machine learning model together with the relative positions of the target objects to the specific portion of the mobile manipulator.

FIG. 7 is a schematic diagram illustrating a variate that may be contained in the state variable of the machine learning model together with the relative positions of the target objects to the specific portion of the mobile manipulator 100. In the operation environment map E, the target objects are represented by circles, and housing positions that are predetermined positions are represented by triangles. As indicated by dashed lines in FIG. 7, in some examples, the state variable of the machine learning model contains route lengths of routes from the target objects to the housing positions associated with the target objects. Even if the relative positions of the target objects to the specific portion P1 of the mobile manipulator 100 are the same, the ease of the cleanup operation varies depending on the route lengths of the routes from the target objects to the housing positions associated with the target objects. Thus, an optimum movement-target object to be moved to a predetermined position at current time can be determined more appropriately. FIG. 7 illustrates a case where the target objects are housed at the closest housing positions, respectively. Alternatively, a housing position C1, C2, C3, or C4 may be determined for each target object.

The state variables described with reference to FIG. 4 to FIG. 7 may be combined as appropriate.

Next, description is given of a specific method for training the machine learning model to obtain the trained NN 320a. The following description is given with reference to FIG. 2 for the control configuration of the mobile manipulator 100 and FIG. 3 for the configuration of the computing device 300 as appropriate.

Figure 8:
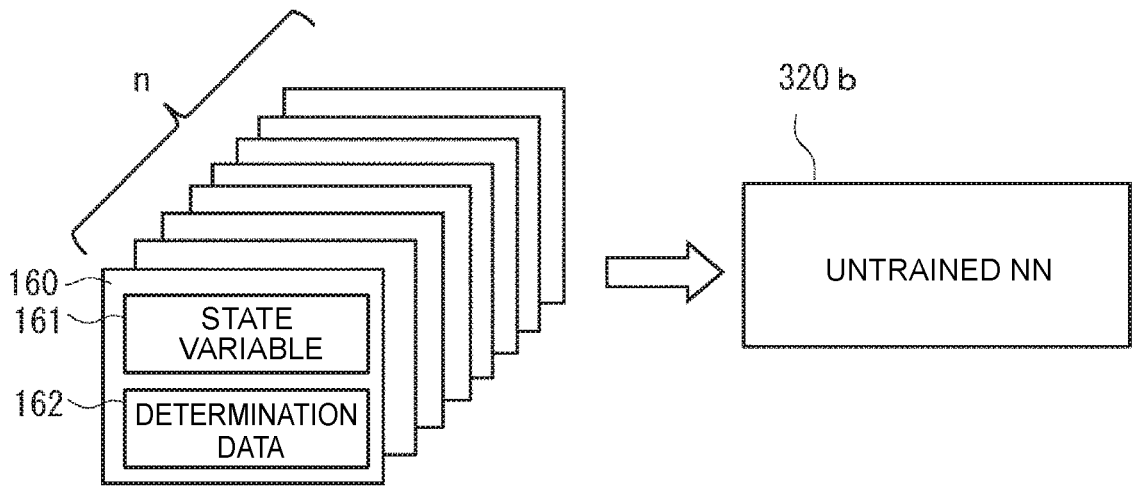
FIG. 8 is a schematic diagram for detailing a method for training an untrained neural network (NN) about a cleanup operation by supervised learning.

FIG. 8 is a schematic diagram for detailing the method for training an untrained NN 320b about the cleanup operation by supervised learning. In this case, the method for training an untrained machine learning model (hereinafter referred to as, for example, "untrained NN 320b") about the cleanup operation is supervised learning. The supervised learning is a method in which, when correct answers are determined in advance for learning-target data, a large number of training data sets that are combinations of the learning-target data (input) and the correct answers (output) are provided in advance to train the machine learning model about the relationships between the input and the output.

As illustrated in FIG. 8, a training data set 160 that is a combination of a state variable 161 (input) and determination data 162 (output) is provided to the untrained NN 320b. As described above, the state variable contains relative positions of target objects to the specific portion of the mobile manipulator 100, and the determination data 162 represents a movement-target object to be cleared away at current time. A plurality of training data sets 160 are acquired in advance. Thus, the untrained NN 320b learns the relationships between the state variables 161 and the pieces of determination data 162 in the cleanup operation. By increasing an acquisition count "n" of the training data sets 160, the determination accuracy of the trained NN 320a can be increased.

Figure 9:
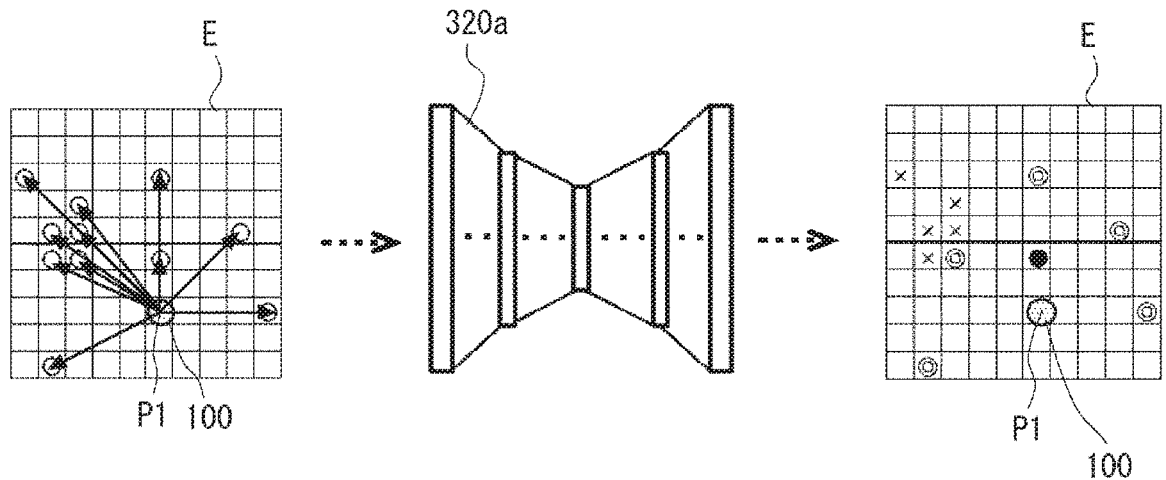
FIG. 9 is a schematic diagram illustrating an input/output concept of a trained NN.

FIG. 9 is a schematic diagram illustrating an input/output concept of the trained NN 320a. As illustrated in FIG. 9, the relative positions (represented by continuous arrows in FIG. 9) of the target objects (represented by circles in FIG. 9) to the specific portion P1 of the mobile manipulator 100 in the operation environment map E are input to the trained NN 320a. Then, the trained NN 320a outputs a movement-target object to be cleared away at current time (represented by a bullet in FIG. 9). The trained NN 320a may output, together with the movement-target object to be cleared away at current time, target objects that may be cleared away at current time (represented by double circles in FIG. 9) or target objects that should not be cleared away at current time (represented by "X" in FIG. 9).

The movement-target object to be moved to a predetermined position at current time may be output as data representing a relative position of the movement-target object to the specific portion of the mobile manipulator 100 on a map or on a bitmap image. Therefore, the output can be represented in a standardized manner. Thus, it is expected that the learning performance of the machine learning model is further improved. When the data representing the relative position of the movement-target object to the specific portion of the mobile manipulator 100 is output on the map or on the bitmap image, there is no need to identify the movement-target object again. Thus, it is expected that the computation amount is reduced.

Figure 10:
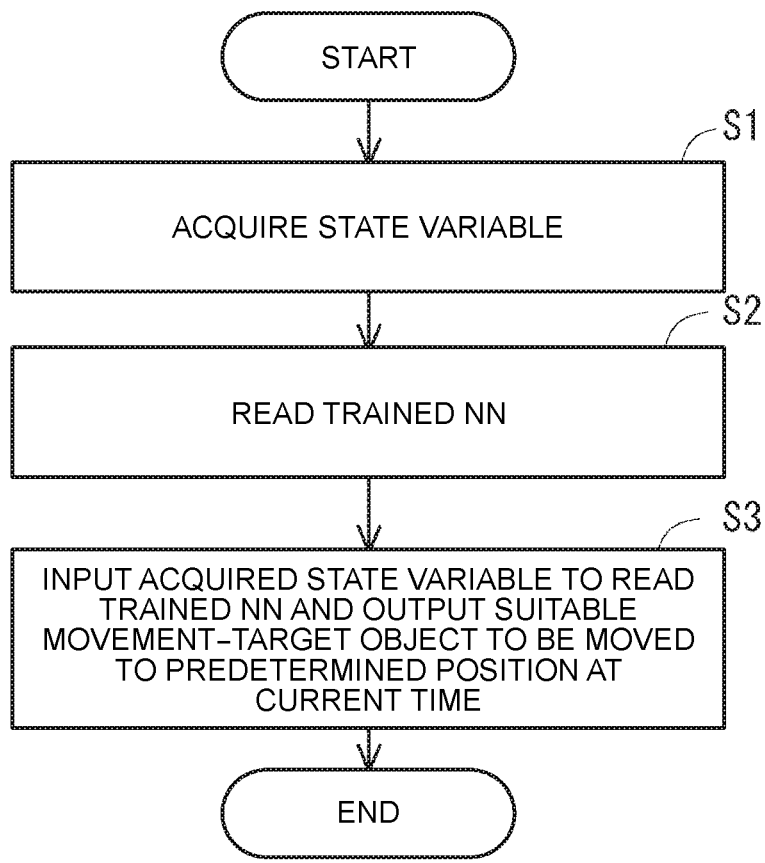
FIG. 10 is a flowchart illustrating a flow of processing to be executed by the computing device.

Next, a flow of processing to be executed by the computing device 300 is described. FIG. 10 is a flowchart illustrating the flow of processing to be executed by the computing device 300. As illustrated in FIG. 10, the acquirer 310 first acquires a state variable containing relative positions of target objects to the specific portion of the mobile manipulator 100 by analyzing image data showing an operation environment photographed by the environment camera 121 or the like, and transfers the state variable to the calculator 330 (Step S1). Then, the calculator 330 reads the trained NN 320a from the storage 320 (Step S2). Then, the acquired state variable (containing the relative positions of the target objects to the specific portion of the mobile manipulator 100) is input to the read trained NN 320a, and the trained NN 320a outputs a movement-target object to be moved to a predetermined position at current time (Step S3). Then, the series of processing operations is terminated.

Figure 11:
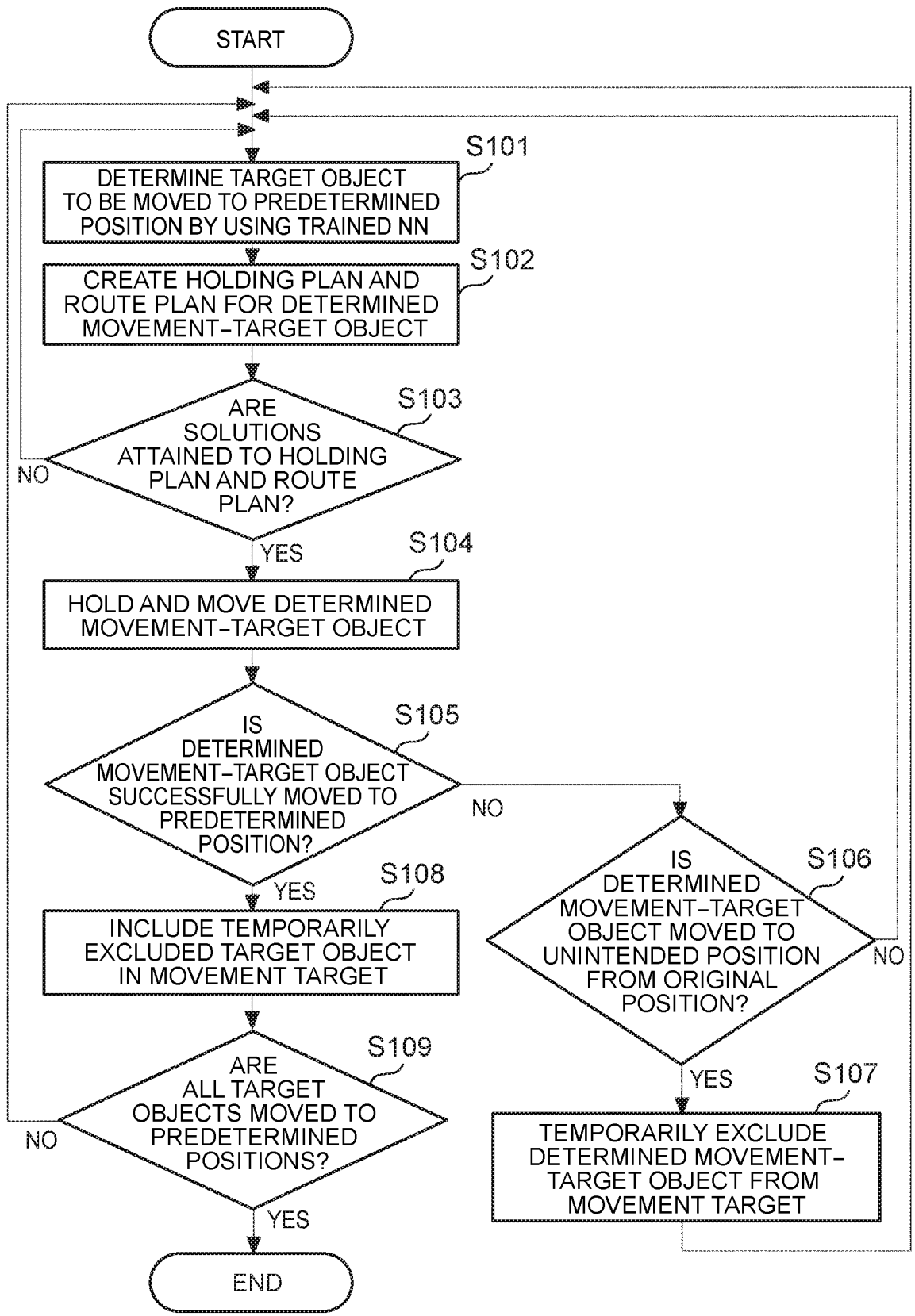
FIG. 11 is a flowchart illustrating a flow of processing to be executed by the mobile manipulator.

Next, a flow of processing to be executed by the mobile manipulator 100 is described. FIG. 11 is a flowchart illustrating the flow of processing to be executed by the mobile manipulator 100. As illustrated in FIG. 11, a target object to be moved to a predetermined position is first determined by using the trained NN (Step S101). This processing corresponds to the processing executed by the computing device 300 described with reference to FIG. 10. Then, a holding plan and a route plan are created for the determined movement-target object (Step S102). The holding plan and the route plan may be created by using a known technique.

Subsequently to Step S102, determination is made whether solutions are attained to the holding plan and the route plan (Step S103). When determination is made in Step S103 that solutions are attained to the holding plan and the route plan, the determined movement-target object is held and moved (Step S104). When determination is made in Step S103 that solutions are not attained to the holding plan and the route plan, the processing returns to Step S101.

Subsequently to Step S104, determination is made whether the determined movement-target object is successfully moved to the predetermined position (Step S105). When determination is made in Step S105 that the determined movement-target object is not successfully moved to the predetermined position, determination is made whether the determined movement-target object is moved to an unintended position from the original position (Step S106). When determination is made in Step S106 that the determined movement-target object is not moved to an unintended position from the original position, the processing returns to Step S101. When determination is made in Step S106 that the determined movement-target object is moved to an unintended position from the original position, the determined movement-target object is temporarily excluded from the movement target (Step S107), and the processing returns to Step S101.

When determination is made in Step S105 that the determined movement-target object is successfully housed at the predetermined position, the temporarily excluded target object is included in the movement target (Step S108). Then, determination is made whether all the target objects are moved to the predetermined positions (Step S109). When determination is made in Step S109 that any target object is not moved to the predetermined position, the processing returns to Step S101. When determination is made in Step S109 that all the target objects are moved to the predetermined positions, the processing is terminated.

As described above, the computing device 300 can appropriately determine an optimum movement-target object to be moved to a predetermined position at current time even though the mobile manipulator is movable.

The present disclosure is not limited to the embodiment described above, but may be modified as appropriate without departing from the spirit of the present disclosure. For example, in the embodiment described above, description is given of the exemplary case where the operation of moving a plurality of target objects to predetermined positions with the manipulator is the cleanup operation. The present disclosure is not limited to this case. For example, the operation of moving a plurality of target objects to predetermined positions with the manipulator may be a preparatory operation that involves arranging objects in a specific place while picking up the objects from one or more places.

In the embodiment described above, the computing device is provided separately from the robot, but may be mounted in the mobile manipulator.

A machine learning model such as a recurrent neural network (RNN) or a sequence-to-sequence model that handles time-series data may be used in the computing device according to the embodiment described above. In the embodiment described above, description is given of the example in which the untrained NN is trained by supervised learning about the operation of moving a plurality of target objects to predetermined positions with the manipulator. The present disclosure is not limited to this case. The untrained NN may be trained by, for example, reinforcement learning or other machine learning methods about the operation of moving a plurality of target objects to predetermined positions with the manipulator.

The constituent elements that are implemented by the computing device of the embodiment described above may also be implemented by, for example, causing a computer (one or more processors) to execute a control program. More specifically, the constituent elements may be implemented by causing the computer to load, on a main memory (not illustrated), the control program stored in a storage (not illustrated) and execute the control program in the main memory. The constituent elements need not essentially be implemented by a software program, but may be implemented by any combination among hardware, firmware, and software.

The program described above may be supplied to the computer by being stored in various types of non-transitory computer readable medium. The non-transitory computer readable medium includes various types of tangible storage medium. Examples of the non-transitory computer readable medium include magnetic storage media (for example, a flexible disk, a magnetic tape, and a hard disk drive), magneto-optical storage media (for example, a magneto-optical disk), a compact disc read-only memory (CD-ROM), a compact disc-recordable (CD-R), a compact disc-rewritable (CD-R/W), and semiconductor memories (for example, a mask ROM, a programmable ROM (PROM), an erasable PROM (EPROM), a flash ROM, and a random access memory (RAM)). The program may be supplied to the computer by various types of transitory computer readable medium. Examples of the transitory computer readable medium include an electric signal, an optical signal, and an electromagnetic wave. The program may be supplied to the computer by the transitory computer readable medium via an electric cable, an optical fiber, or other wired communication paths, or via wireless communication paths.

What is claimed is:

1. A computing device configured to perform computation for controlling operations of a mobile manipulator configured to hold a plurality of target objects with a manipulator and move the target objects to predetermined positions, the computing device comprising:
   a storage configured to store a trained machine learning model trained by inputting a plurality of training data sets, which are combinations of state variables and pieces of determination data associated with the state variables, the training data sets being acquired in advance;
   a calculator configured to output a movement-target object to be moved to a predetermined position at current time by inputting a state variable to the trained machine learning model read from the storage; and
   a controller configured to control operation of the mobile manipulator based on the output movement-target object, wherein
   the state variable contains relative positions of the target objects to a specific portion of the mobile manipulator,
   the determination data associated with the state variable represents the movement-target object,
   the state variable contains a relative position of an obstacle to the specific portion of the mobile manipulator,
   the relative positions of the target objects to the specific portion of the mobile manipulator and the relative position of the obstacle to the specific portion of the mobile manipulator are represented by data on a map or on a bitmap image, and
   the calculator is configured to output data representing a relative position of the movement-target object to the specific portion of the mobile manipulator on the map or on the bitmap image.

2. The computing device according to claim 1, wherein the state variable contains route lengths of routes from the mobile manipulator to the target objects, the route lengths being obtained based on a route plan.

3. The computing device according to claim 2, wherein the state variable contains route lengths of routes from the target objects to predetermined positions associated with the target objects.

4. The computing device according to claim 1, wherein relative positions of the target objects and the obstacle to the specific portion of the mobile manipulator contain information on a gravity direction.

5. The computing device according to claim 1, wherein the relative positions of the target objects to the specific portion of the mobile manipulator contain information on holdable areas for the target objects.

6. A machine learning method for a machine learning model configured such that a computer performs a function of outputting a movement-target object to be moved to a predetermined position at current time in an operation of holding a plurality of target objects with a manipulator of a mobile manipulator and moving the target objects to predetermined positions, the machine learning method comprising:

training the machine learning model by inputting a plurality of training data sets, which are combinations of state variables and movement-target objects to be moved to predetermined positions at current time, the state variables each containing relative positions of the target objects to a specific portion of the mobile manipulator, the movement-target objects being represented by pieces of determination data and associated with the state variables; and controlling operation of the mobile manipulator based on the output movement-target object, wherein the state variable contains a relative position of an obstacle to the specific portion of the mobile manipulator, the relative positions of the target objects to the specific portion of the mobile manipulator and the relative position of the obstacle to the specific portion of the mobile manipulator are represented by data on a map or on a bitmap image, and the computer is configured to output data representing a relative position of the movement-target object to the specific portion of the mobile manipulator on the map or on the bitmap image.

7. A computing device configured to perform computation for controlling operations of a mobile manipulator configured to hold a plurality of target objects with a manipulator and move the target objects to predetermined positions, the computing device comprising:

a storage configured to store a trained machine learning model trained by inputting a plurality of training data sets, which are combinations of state variables and pieces of determination data associated with the state variables, the training data sets being acquired in advance; and a calculator configured to output a movement-target object to be moved to a predetermined position at current time by inputting a state variable to the trained machine learning model read from the storage, and a controller configured to control operation of the mobile manipulator based on the output movement-target object, wherein the state variable contains relative positions of the target objects to a specific portion of the mobile manipulator, the determination data associated with the state variable represents the movement-target object, the state variable contains route lengths of routes from the mobile manipulator to the target objects, the route lengths being obtained based on a route plan, and the state variable contains route lengths of routes from the target objects to predetermined positions associated with the target objects.

* * * * *